United States Patent [19]

Logue et al.

[11] 4,268,908
[45] May 19, 1981

[54] MODULAR MACROPROCESSING SYSTEM COMPRISING A MICROPROCESSOR AND AN EXTENDABLE NUMBER OF PROGRAMMED LOGIC ARRAYS

[75] Inventors: Joseph C. Logue; Wei-Wha Wu, both of Poughkeepsie, N.Y.

[73] Assignee: International Business Machines Corporation, Armonk, N.Y.

[21] Appl. No.: 15,505

[22] Filed: Feb. 26, 1979

[51] Int. Cl.³ .............................................. G06F 9/22
[52] U.S. Cl. .................................. 364/200; 307/465; 364/716
[58] Field of Search ... 364/200 MS File, 900 MS File, 364/716, 731–735; 307/DIG. 5, 203, 207, 209; 328/92

[56] References Cited

U.S. PATENT DOCUMENTS

| | | | |
|---|---|---|---|
| 3,916,169 | 10/1975 | Cochran | 307/205 X |
| 3,949,370 | 4/1976 | Reyling et al. | 364/200 |
| 3,959,774 | 5/1976 | Mead | 364/200 |
| 3,962,683 | 6/1976 | Brown et al. | 364/200 |
| 3,983,538 | 9/1976 | Jones | 364/716 |
| 3,988,717 | 10/1976 | Kisylia | 364/200 |
| 4,040,032 | 8/1977 | Kreiker | 364/200 |
| 4,074,351 | 2/1978 | Boone et al. | 364/200 |

Primary Examiner—Mark E. Nusbaum
Attorney, Agent, or Firm—Robert J. Haase

[57] ABSTRACT

A modular system comprising a microprocessor having a system bus (control address and data) and one or more programmed logic arrays connected to said system bus. Three system configurations are shown by way of example, Macroprocessor, Peripheral Input/Output and Direct Memory Access applications. The microprocessor executes a standard set of instructions and addresses each programmed logic array. Each array executes a specific instruction, beyond the standard set of instructions, upon receipt of its address.

7 Claims, 13 Drawing Figures

| ADDRESS | | | | | | | | | | | | | | | | COMPONENT | MEMORY MAP (HEX) | NO. OF ADDRESSES |
|---|---|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | | | |
| 0 | 0 | • | • | • | • | • | • | • | X | X | X | X | X | X | X | RAM 9 | 0000–007F | 128 |
| 1 | 1 | • | • | • | • | X | X | X | X | X | X | X | X | X | X | ROM 8 | 0000–03FF | 1,024 |
| 0 | 1 | • | • | • | • | • | • | • | • | • | • | • | 1 | X | X | PIA | 4004–4007 | 4 ⎫ |
| 0 | 1 | • | • | • | • | • | • | • | • | • | • | 1 | • | • | X | ACIA | 4008–4009 | 2 ⎭ |
| 1 | 0 | • | • | • | • | • | • | • | • | X | X | X | X | X | X | PLA4 | 8000–803F | 64 |

X = VARIABLE ADDRESS
• = DON'T CARE

FIG. 9A  WRITE DATA IN PLA 4 USING 6800 STAA INSTRUCTION

FIG. 9B  READ DATA FROM PLA 4 USING 6800 LDAB INSTRUCTION

INTR.PGM1

| | | |
|---|---|---|
| PC → K | LDAA | (M) → A |
| K+1 | P2OLOH | PLA5 (O.L.) → A |
| K+2 | P2OLOL | |
| K+3 | STAA | (A) → M |
| K+4 | (CMP&AJS)H | (A) → CMP & AJS → PLA1 O.L. |
| K+5 | (CMP&AJS)L | |
| K+6 | LDAA | (M) → A |
| K+7 | P1OLOH | PLA4 (O.L.) → A |
| K+8 | P1OLOL | |
| K+9 | RTI | RETURN FROM INTERRUPT |

INTR.PGM2

| | | |
|---|---|---|
| PC → L | STAA | (A) → M |
| L+1 | DBPOH | (A) → PLA5 PERIPHERAL OUTPUT |
| L+2 | DBPOL | |
| L+3 | RTI | RETURN FROM INTERRUPT |

MODULAR MACROPROCESSING SYSTEM COMPRISING A MICROPROCESSOR AND AN EXTENDABLE NUMBER OF PROGRAMMED LOGIC ARRAYS

TECHNICAL FIELD

This invention relates to techniques for readily extending the preexisting functional capabilities of a microprocessor. More particularly, the invention is concerned with a system comprising a microprocessor and one or more programmed logic arrays connected together using a common system bus.

BACKGROUND ART

Programmed logic arrays have been used to execute instructions in computer systems such as, for example, in U.S. Pat. No. 3,949,370, Ser. No. 477,053, "Programmable Logic Array Control Section for Data Processing System", G. F. Reyling, Jr. et al., issued Apr. 6, 1976; U.S. Pat. No. 3,962,683, Ser. No. 394,361, "CPU Programmable Control System", M. Brown et al., issued June 8, 1976; and U.S. Pat. No. 4,074,351, Ser. No. 771,498, "Variable Function Programmed Calculator", G. W. Boone et al., issued Feb. 14, 1978. The PLA's in these patents are arranged on two levels, one PLA generating an instruction or address and all other PLA's responding thereto with the execution of a subroutine on a level lower than that of the first PLA. In effect, the PLA's in each of the aforementioned patents provide the CPU sequencing control. More generally, sequence processing also has been accomplished broadly by means of a module consisting of a PLA coupled with a memory, as shown in U.S. Pat. No. 3,983,538, Ser. No. 465,783, "Universal LSI Array Logic Modules with Integral Storage Array and Variable Autonomous Sequencing", J. W. Jones, issued Sept. 28, 1976. The module is configured to operate autonomously as a selectively programmed miniprocessor with distinctively specialized or personalized operation capabilities and repertoire. Although the combination of PLA and memory is a high performance emulator, it suffers the drawback of higher cost, relative to the present invention, because the PLA required is relatively larger. The combination of PLA and microprocessor in accordance with the present invention, on the other hand, enjoys a cost advantage in that the PLA required is relatively smaller and the microprocessor utilized is commercially available at low cost.

SUMMARY OF THE INVENTION

The invention relates to a system for extending the functional capability of a microprocessor to execute at least one additional instruction beyond its capability to execute a given standard set of instructions. The system comprises said microprocessor and at least one programmed logic array (PLA) which communicate with each other through the standard system bus (control, address and data) associated with the microprocessor. Each PLA is used as a functional execution unit which interprets a respective address received from the microprocessor as a respective instruction and responds thereto by executing said instruction and placing the results on the data bus. This arrangement provides system modularity and functional flexibility; it makes it possible to add custom instructions (and thus extend the preexisting microprocessor CPU capabilities) to well-tailor a system for better cost/performance and fast design turnaround time, and to make for easy machine operation. The microprocessor functional capability is extended without requiring modification of the microprocessor while taking full advantage of the low development cost and fast turnaround inherent in PLA design.

DISCLOSURE OF INVENTION

Figure 1:
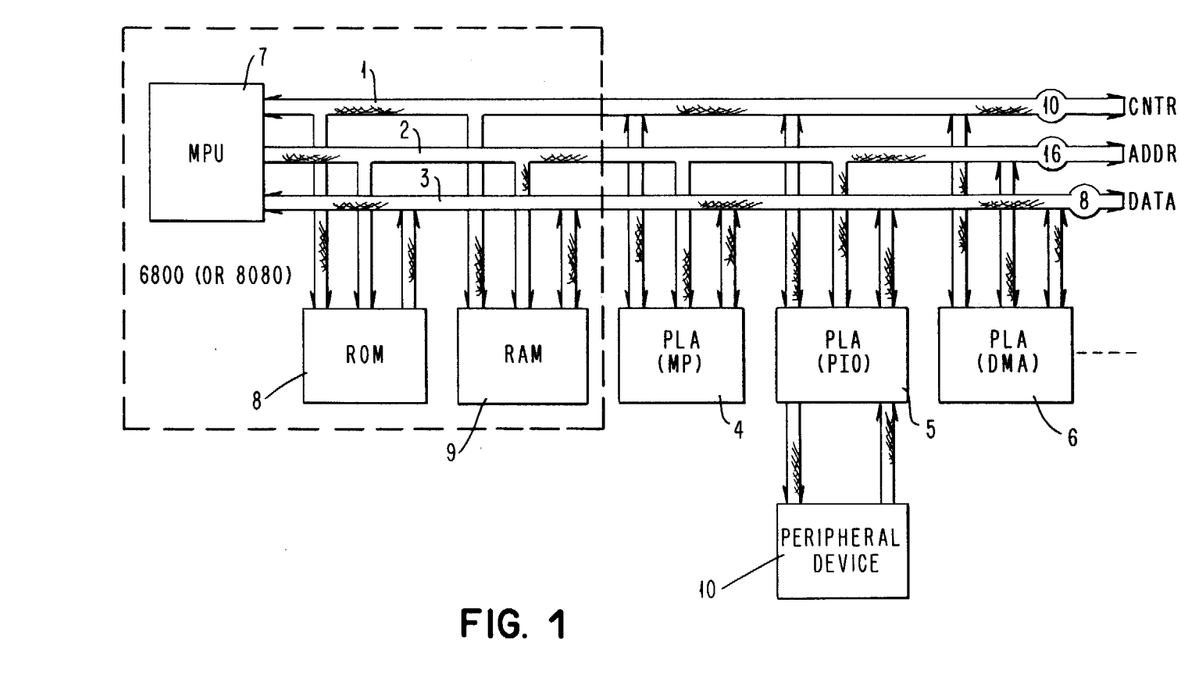
FIG. 1 is a system block diagram of a modular macroprocessing system in accordance with the present invention.
Figure 2:
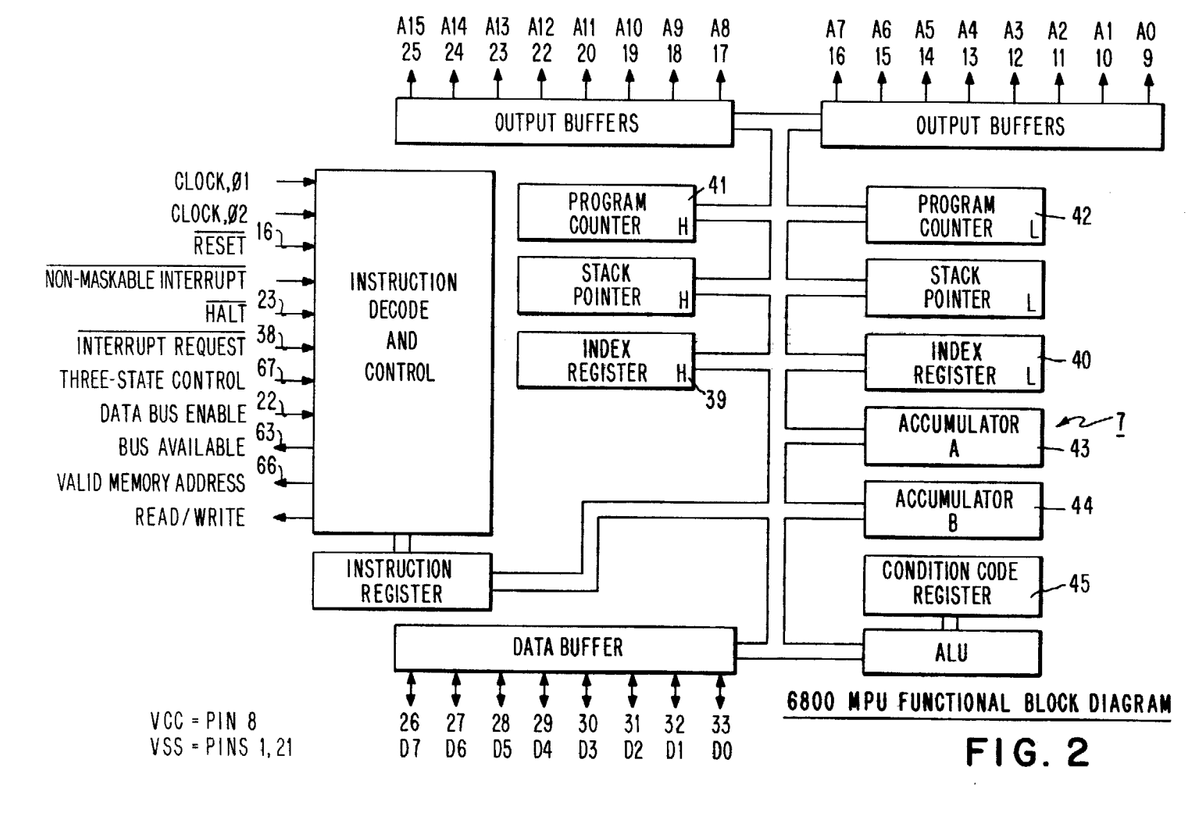
FIG. 2 is a functional block diagram of a commercially available microprocessor suitable for use in the present invention.

FIG. 1 is a system block diagram of the present invention. The system components communicate with one another through a standard system bus; control bus 1, address bus 2 and data bus 3. This bussing structure is a main feature of the microprocessors commercially available for simplifying both the hardware and the software required in microcomputer applications. The PLA's 4, 5 and 6 are used as FEU's (Functional Execution Units). They are part of the system building blocks, and are structured in such a way that they can be plugged directly into the system bus to execute high-level instructions. The MPU 7, ROM 8 and RAM 9 are components of a standard commercially available microcomputer, such as, for example, the Motorola 6800 or the Intel 8080. Although the component counts of the 6800 and 8080 microcomputers are different, their bussing structure are the same, having 10 control lines, 16 address lines and an 8 bi-directional data bus. FIG. 2 shows the functional block diagram of the 6800 processor unit. It should be noted that two or more PLA's having the same architecture can be connected in parallel to expand functional capabilities, such as the number of macros, the number of peripheral input/output ports, or the number of DMA address bits.

The architecture of the present invention can be configured in three types, i.e., MP, PIO, and DMA. The MP configuration (PLA 4 of FIG. 1) executes high-level macro functions such as a subroutine, a multiplication, a conversion table, a special algorithm, a counter/timer function, parity detection/generation, a CRC (Cycle Redundancy Check), a polling sequence, a ping-pong buffer control, a compare/branch function, etc. The PIO configuration (PLA 5) interfaces the peripheral devices 10 to the microprocessor 7 and executes the I/O functions such as a SERDES (SERIALIZER/-DESERIALIZER) process, a data format generator, a time interval decoder, a data detector, a transition pulse generator, a MODEM (MODULATOR/-DEMODULATOR) operation, an add/insert/delete process, etc. The DMA configuration (PLA 6) directly transfers data blocks between the main memory (RAM 9) and external devices (not shown). Examples will be given to show how the PLA's 4, 5 and 6 communicate with the MPU 7 under program control. MICROPROCESSOR (MP) CONFIGURATION: Proper operation of PLA 4, controlled by MPU 7, requires that certain control and timing signals be provided and that the the peripheral circuits of PLA 4 be partitioned in such a way that it effectively accomplishes specific functions, either combinatorial or sequential. The block diagram of the PLA 4 architected in MP configuration is shown in FIG. 3.

Bidirectional data bus 3 transfers data to and from MPU 7. The data output drivers 11 are tri-state drivers controlled by TSC line 12. When the TSC line is turned on, the output is essentially an open circuit (high impedance state). This permits the data stored in the output latches 13 (OL) to be isolated from the data bus. The data input latches 14 are gated latches (D-type or polarity hold) used as an input buffer and controlled by ILC line 15. When the ILC line goes high, the input is not gated. This prevents the data on the data bus from "sinking" (being processed) through the PLA.

Figure 4:
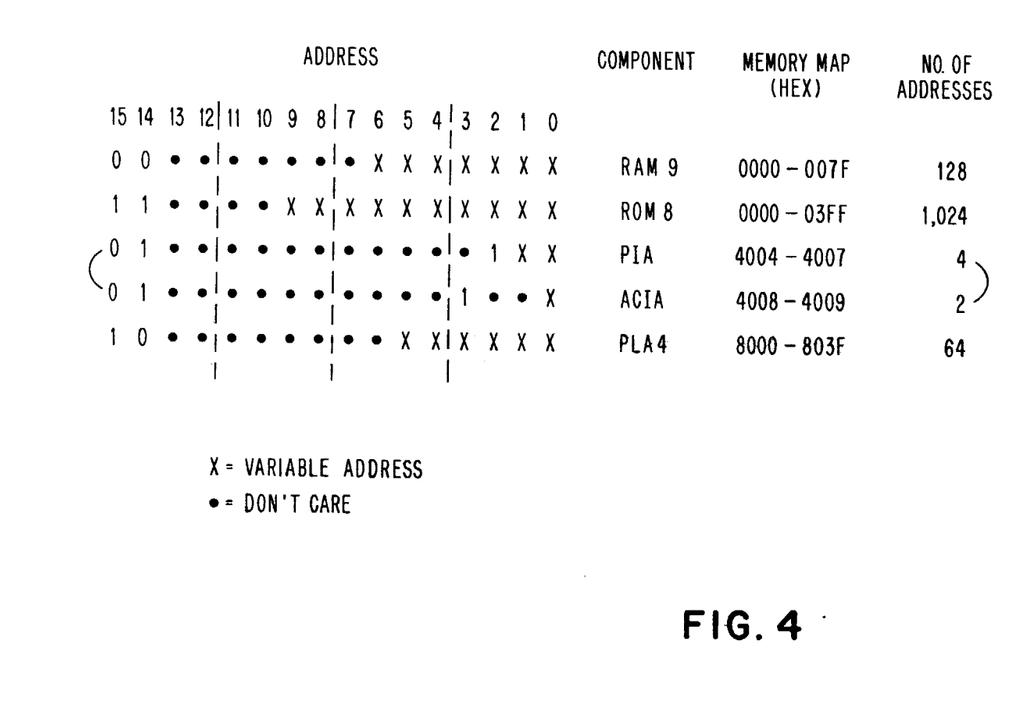
FIG. 4 is a memory map relating to the embodiment of FIG. 3.

Eight inputs are used to address a macro, which is a group of bit patterns (or product terms) performing a specific function. Essentially, the address itself is used as the macro OPCODE, and 8 of the input latches 14 associated with address bus 2 are used as an Instruction Register. Depending upon how the 8 inputs are connected to the address bus 2, the number of addressable macros will be different. FIG. 4 shows the memory map of a typical MP system. This map represents the locations in memory where each system component is located. For example, the address bits A15 and A14 are tied to the PLA 4 address inputs. Therefore, whenever A15 is high and A14 is low, PLA 4 will be conversing with the MPU 7 on the data bus 3. Since two bits are used to allocate PLA 4, the remaining 6 bits allows for a maximum of 64 macros (OPCODES). The number of macros could be more if two or more macros always occur in sequence. These macros can be distributed in several PLA's such as PLA 4. It should be noted that quite a few memory addresses are useless because of the memory mapping technique used in FIG. 4. If every bit of available memory address is to be utilized, a 16-line address bus or external decoding circuitry must be employed.

Figure 3:
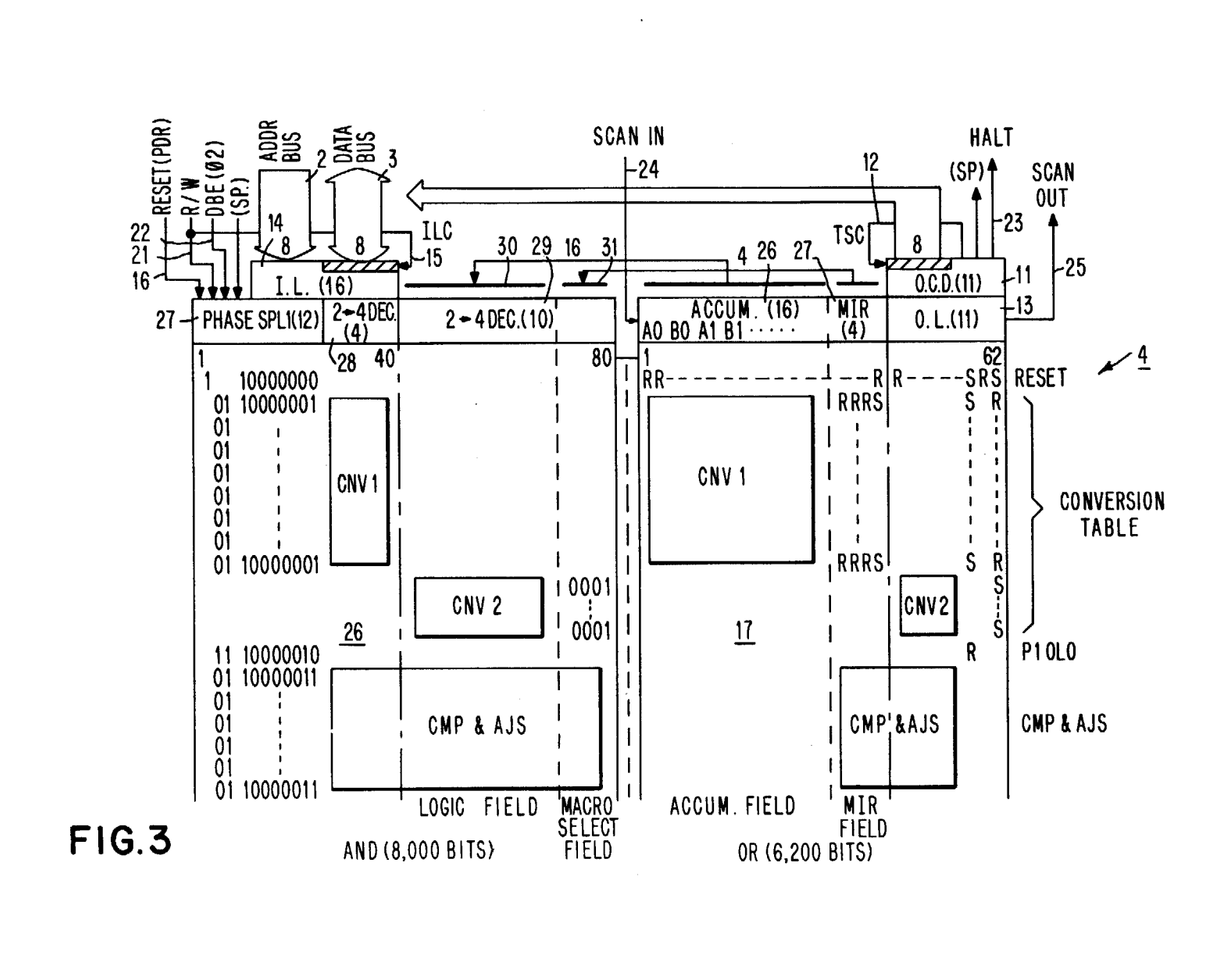
FIG. 3 is a block diagram of a macroprocessor species of the invention.

The reset input 16 of FIG. 3 resets and starts PLA 4 from power down condition, resulting from a power failure or an initial start-up of the processor. When input 16 is up, all the registers and latches in the OR array 17 of the PLA 4 are cleared, and the Halt line 23 is at high state.

The Read/Write (R/W) input 21 is tied to the MPU 7 R/W control line 21 of FIG. 2. Input 21 signals PLA 4 whether the MPU 7 is in a Read (high) or Write (low) state. This input is also tied to the ILC input 15 to control the data flow either going to the MPU 7 or to the PLA 4. In the Read cycle, the ILC line 15 is at high state and the gated inputs to input latches 14 are closed. In the Write cycle, they are open.

The Data Bus Enable (DBE) input 22 is tied to the MPU 7 DBE control line 22 of FIG. 2 which in normal operation is driven by the phase two clock ($\phi$ 2). It indicates to the PLA 4 that there is valid data on the data bus 3 to enable the execution of a macro.

The $\overline{\text{Halt}}$ output 23 is connected to the MPU 7 $\overline{\text{Halt}}$ control line 23 of FIG. 2. When output 23 is in the low state, all the activity in the processor unit 7 is halted and the processor will stop at the end of an instruction. Since the processor 7 and the PLA 4 operate asynchronously, the $\overline{\text{Halt}}$ signal puts the processor in the wait state until the PLA 4 completes its task. It may take more than one cycle for the PLA 4 to execute a macro if it is a sequential function. If the macro is a combinatorial one and it takes one cycle, the $\overline{\text{Halt}}$ signal 23 is not required.

The Scan-In lines 24 and the Scan-Out 25 are added for testing purpose. Since all the latches in the OR array 17, i.e., accumulators 26, Macro Instruction Register (MIR) 27 and Output Latches 13 are connected in series to form a shift register, testing data can be shifted in at the Scan-In input, and the test result can be shifted out at the Scan-Out output.

Two-bit partition is not required for the control and the address input portion of the AND array 26 because they are used strictly for decoding and not for performing logic. These inputs are tied to the phasesplitters 27. The data bus (28) portion and the feedback (29) portion of the AND array 26 are two-bit partitioned for enhancing the logic function. The AND array, having 100 product terms, is organized as 80 × 100 bits. It should be noted that, for the application of executing high-level instructions, the number of product terms becomes more important than the number of inputs. The feedback portion is divided into logic (30) and macro-selection (31) fields. The logic field 30, 16-bits wide, is used to perform combinatorial and sequential functions, and the macro-selection field 31, 4-bits wide, is for selecting macros (a total of 16).

The feedback portion of the OR array 17 is divided into accumulator 26 and Macro Instruction Register (MIR) 27 fields. The accumulator field, 16-bit wide, has two accumulators, A and B, partitioned in two-bit fashion, A0B0, A1B1, A2B2, etc. The MIR field has the same purpose of selecting macros as the address bus 2 does. However, for performing sequential function (one macro followed by another), the MIR 27 speeds up the execution because there is no need for the processor to send macro instruction (OPCODE) to the PLA via the address bus 2. The output portion 13 of the array uses JK-type latches as an output buffer (11-bit). It is followed by off-chip-drivers (OCD) 11, having tri-state capability. The OR array 17 is organized as 62 × 100 bits.

PERIPHERAL INPUT/OUTPUT (PIO) CONFIGURATION: In the PIO 5 configuration of FIG. 5, input and output ports associated with hand-shake signals are added. Peripheral inputs 32 and peripheral outputs 33 are connected to the peripheral devices (not shown), such as a keyboard, a CRT display, a printer, a magnetic storage (tape or disc) or groups of sensors and actuators. In normal operation, these input/output ports are used for transferring data (one byte or two bytes) between the external devices (not shown) and the MPU 7 of FIG. 1 via the PLA 5.

The input ready signal on line 34 comes from the peripheral device. It indicates to the PLA 5 that its data are available at peripheral input. The input acknowledge signal on line 35 goes to the peripheral device. It indicates to the device that the data have been received. The output request line 36 signals the PLA 5 that the device is requesting the data. The output ready line 37, on the other hand, indicates to the device that the data are available at the peripheral circuit outputs of PLA 5. The Interrupt Request (IRQ) 38 output requests that a hardware interrupt sequence be generated within the machine. The program flow diagram of the hardware interrupt sequence is shown in FIG. 6. Before the processor recognizes this request, the processor will wait until it completes (46 of FIG. 6) the current instruction that is being executed. At that time, if the interrupt mask bit in the condition code register of the MPU 7 of FIGS. 1 and 2 is not set (47 of FIG. 6) the machine will begin an interrupt sequence. The contents of index registers 39 and 40 of FIG. 2, program counters 41 and 42, accumulators 43 and 44, and condition code register 45 are stored away (48 of FIG. 6) on the stack. Next, the MPU 7 will respond to the interrupt request by setting (49 of FIG. 6) the interrupt mask bit high so that no further interrupts may occur. At the end of the cycle, the program counter will be loaded (50 of FIG. 6) with a 16-bit address, which is the contents of the memory locations, FFF8, and FFF9, that points to a vectoring address. An address loaded at these locations causes the MPU 7 to branch to an interrupt routine in memory.

The Halt line 23 must be in the high state for interrupts to be recognized. External interrupt priority circuitry can be added to the machine, if more than one IRQ line is used.

Figure 5:
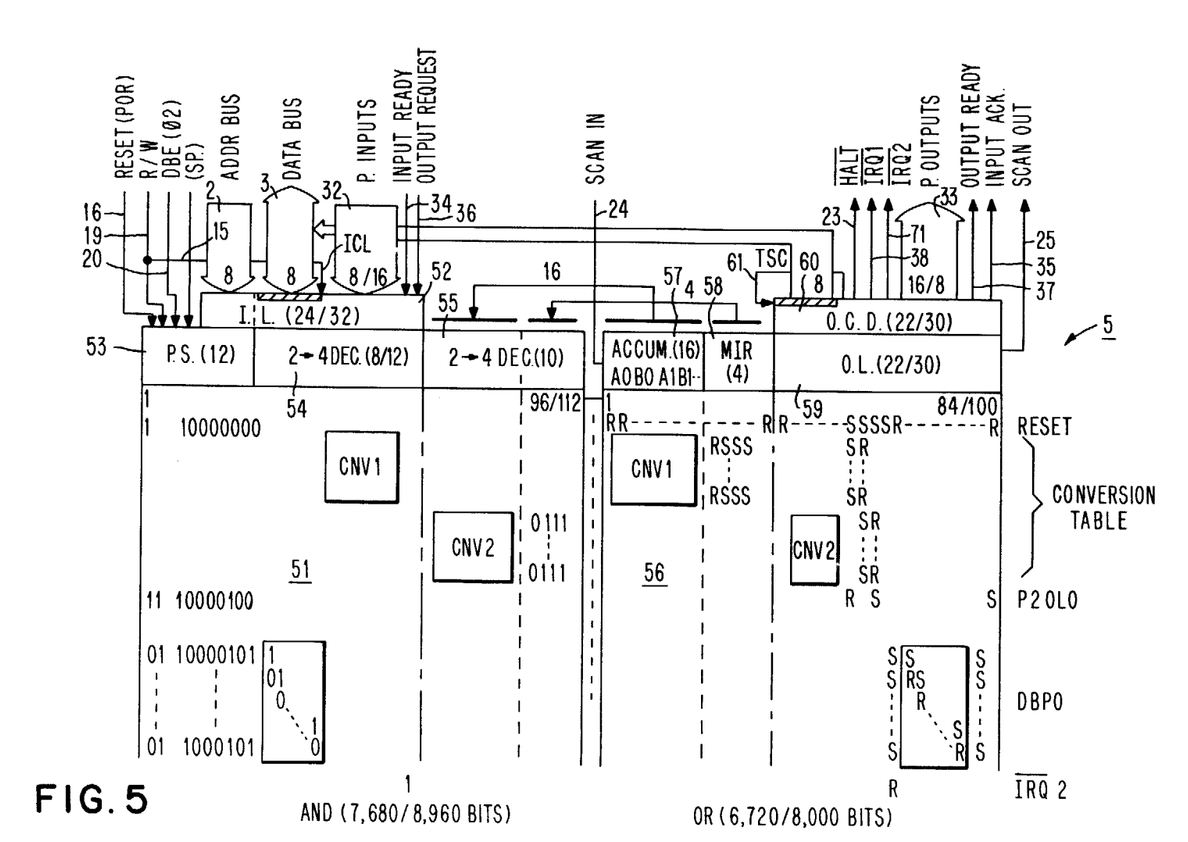
FIG. 5 is a block diagram of a peripheral I/O species of the invention.
Figure 6:
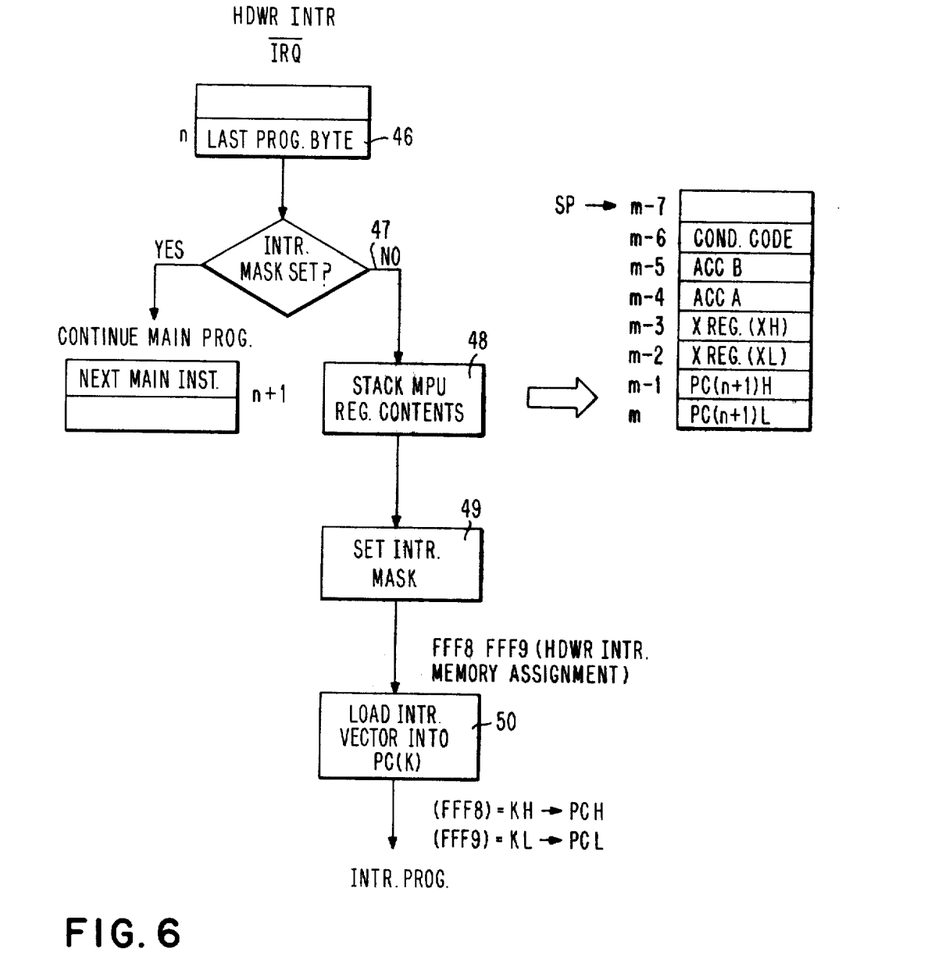
FIG. 6 is a program flow diagram relating to the microprocessor of FIG. 2.

Referring to FIG. 5, the AND array 51 peripheral circuits comprising input latch 52, phase splitter 53, two-to-four decoders 54 and 55 are similar to the corresponding portions of AND array 26 of the MP array of FIG. 3 previously described. It should be noted that the input latch 52 (D-type), used as an input buffer, is required because the signals from the peripheral device may not be stable; the pulse width might be either narrow or bouncing. The input latch allows the input signal to have a minimum available time. The AND array 51 is organized as 96×80 or 112×80 bits depending upon whether the input port is 8 or 16 lines respectively.

The OR array 56 peripheral circuits comprising accumulators 57 (A and B) MIR 58, output latch 59, OCD 60 and TSC 61 are similar to the corresponding portions of OR array 17 of the MP array of FIG. 3 previously described. OR array 56 is organized as 84×80 or 100×80 bits depending upon the number of lines at the output port.

Figure 7:
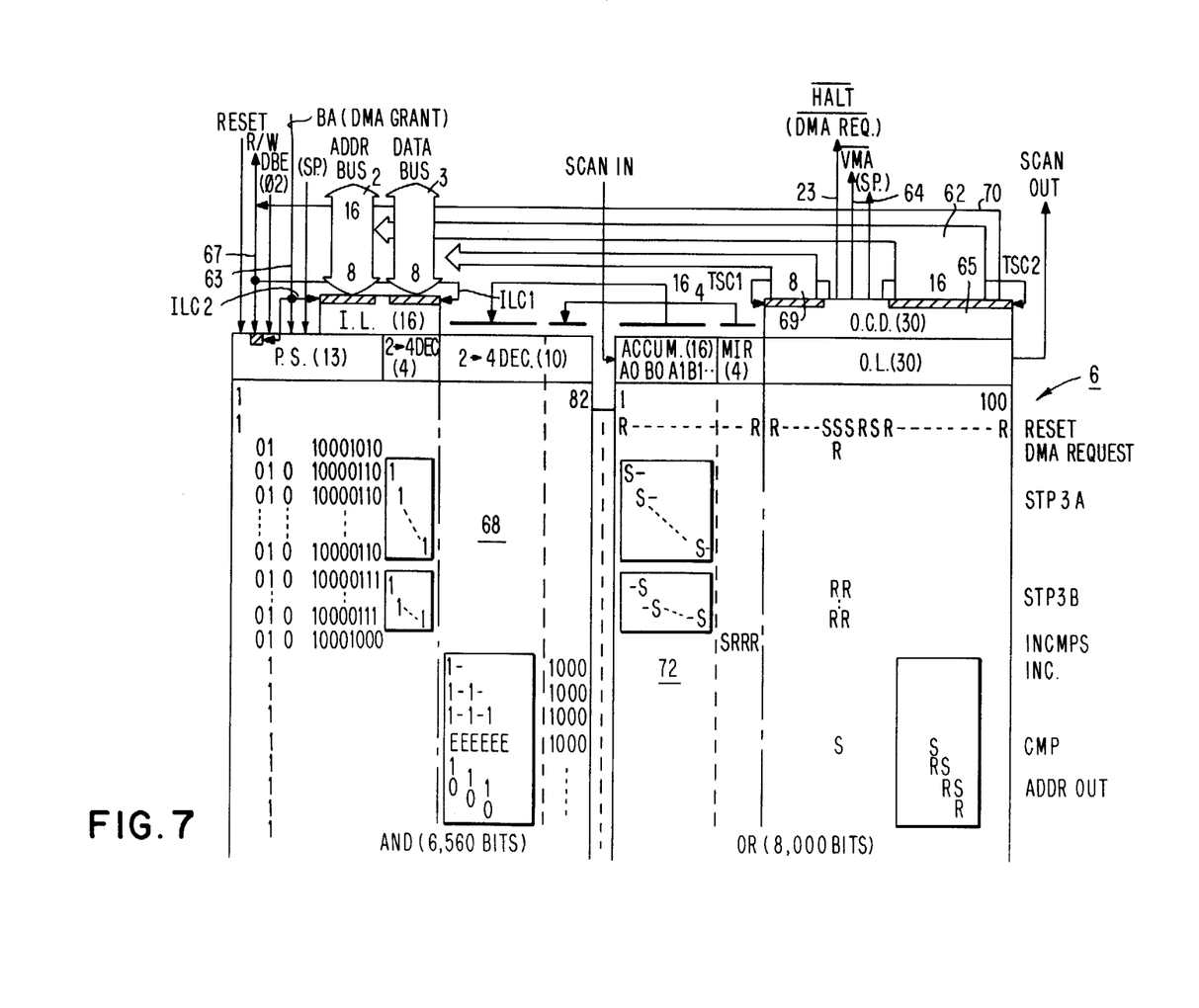
FIG. 7 is a block diagram of a direct memory access species of the invention.

DIRECT MEMORY ACCESS (DMA) CONFIGURATION: For display, printer and disc or tape storage applications, a block of data is frequently transferred back and forth between the main memory RAM 9 of FIG. 1 and the external device (not shown). The DMA technique enables the data to be transferred in or out of main memory 9 without involving the MPU 7. Thus, the MPU 7 throughput is increased. The PLA 6 architected in the DMA configuration is shown in FIG. 7. In this configuration, a 16-bit address bus 62 at the PLA 6 output and the following control signals are required: Bus Available (BA) 63, Valid Memory Address ($\overline{\text{VMA}}$) 64 and Read/Write (R/W) 67.

The Bus Available (BA) input line 63 comes from the MPU 7 of FIG. 2 and is used as DMA Grant. It goes to a high state when the MPU 7 has halted and all tri-state lines are in high impedance state, indicating that DMA transfers can begin.

The Valid Memory Address ($\overline{\text{VMA}}$) output line 64 is from an open collector gate at the PLA output 65 and is low when the MPU 7 is halted. This signal is wire-ORed with the MPU VMA line 66 of FIG. 2 and is used to enable the RAM 9 of FIG. 1 during a DMA transfer. The read/write (R/W) output line 67 is a command signal used to control the direction of transfer during a DMA operation. This output is a tri-state output driver controlled by TSC2 line 70. The R/W line 67 at the PLA 6 input is inversely gated to the BA line 63 shown in FIG. 7; when the BA line 63 is high, the R/W signal 67 has no effect to the corresponding column in the AND array 68 of PLA 6.

It should be noted that the PLA outputs 62, 69 and 70 connected to the MPU's address bus 2, data bus 3, and R/W line 67 have tri-state outputs which are in the high impedance state when BA line 63 is low and the MPU 7 is controlling the address, data, and control busses. The Halt signal 23 at the output is used as DMA request, which commands the MPU 7 to halt and place all its tri-state lines in high impedance state. The detailed operation and the timing of DMA transfers by halting the MPU 7 is well understood in the art. The remainder of the input and output lines, as well as the PLA 6 peripheral circuits are similar to those described in the MP and the I/O configurations earlier.

PROGRAM CONTROL: Within each PLA, there are groups of bit patterns or product terms called macros, which perform specific functions. Each macro is given an OPCODE of a high-level instruction which can be matched (or decoded) by the AND array through the address bus. When it is matched, the macro is executed and the result will be stored temporarily in the accumulators or in the output latches depending upon the function being performed. The result then has to be sent back to the processor or be transferred to the external device.

Each PLA is a high speed functional execution unit for executing high-level instructions, which are ordinarily executed through subroutines in a step-by-step sequential manner within the processor. The control of the data transfer between the MPU 7 and the PLA's 4, 5 and 6 of FIG. 1 can be accomplished by employing the following instructions in the exemplary case where MPU 7 is a Motorola 6800 microprocessor.

| MNEMONIC | OPCODE/ADDRESS | | OPERATIONS |
|---|---|---|---|
| | MODE | | |
| STAA | B7 | Extnd | Store Accumulator A, (A) → M |
| STAB | F7 | Extnd | Load Accumulator B, (B) → M |
| LDAA | B6 | Extnd | Load Accumulator A, (M) → A |
| LDAB | F6 | Extnd | Load Accumulator B, (M) → B |
| JMP | 7E | Extnd | Jump |
| RTS | 39 | Inher | Return From Subroutine |
| RIT | 38 | Inher | Return From Interrupt |

In order to describe the usage of the 6800 instructions listed above in some examples, PLA macro instructions and their opcodes shown in the following table are provided.

| MNEMONIC | OPCODE (HEX) | OPERATIONS |
| --- | --- | --- |
| RESET | 8000 | Reset |
| CNV | 8001 | Data Conversion |
| P1OLO | 8002 | PLA1 Output Latch Open |
| CMP & AJS | 8003 | Compare and Adjust |
| P2OLO | 8004 | PLA2 Output Latch Open |
| DBPO | 8005 | Data Bus to Peripheral Output |
| STP3A | 8006 | Store PLA3 Accumulator A |
| STP3B | 8007 | Store PLA3 Accumulator B |
| INCMPS | 8008 | Select Increment, Compare and Address Out Macro |
| DPOS | 8009 | Select Data Bus to Peripheral Output Macro |
| DMAR | 800A | DMA Request |

The following examples demonstrate the usage of the above instructions.

EXAMPLE 1

Figure 8:
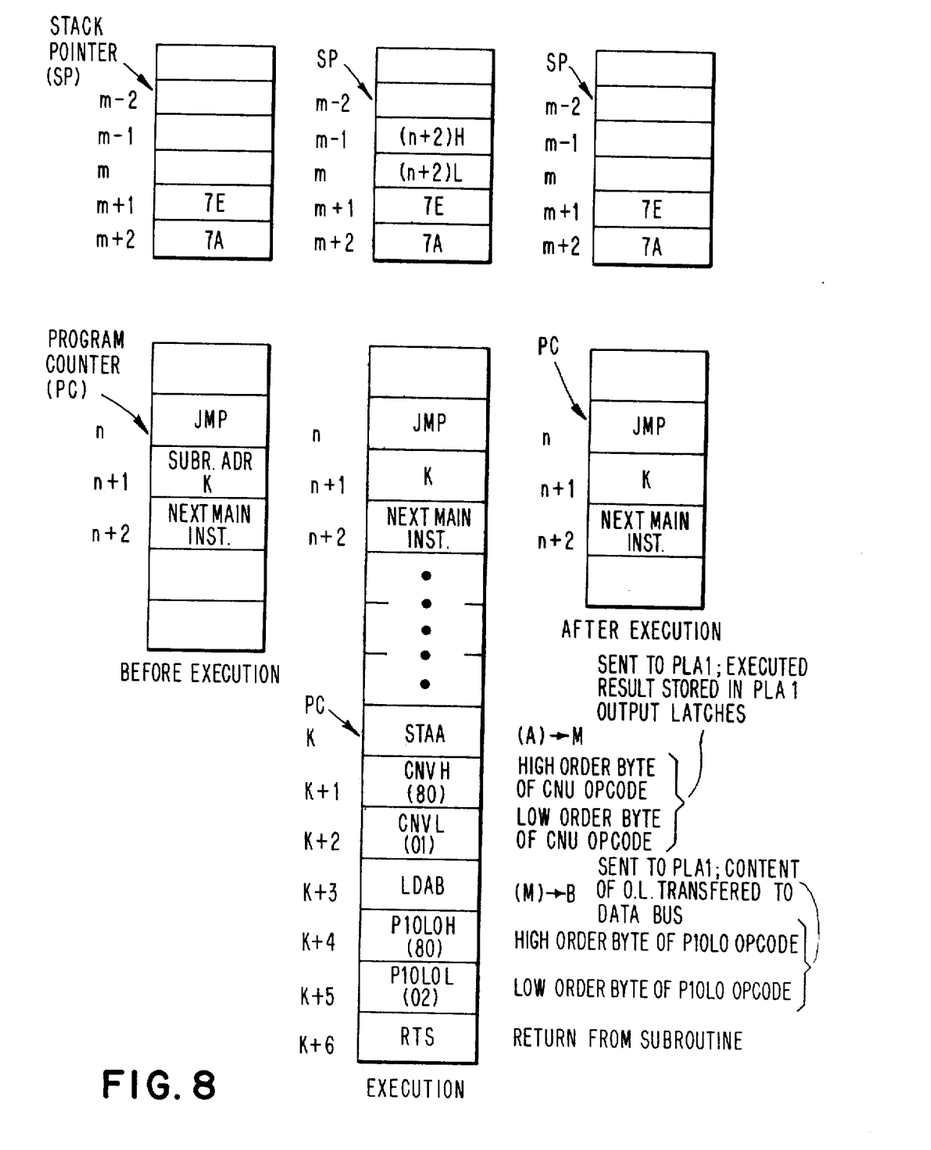
FIG. 8 is a program flow diagram relating to the embodiment of FIG. 3.
Figure 9A:
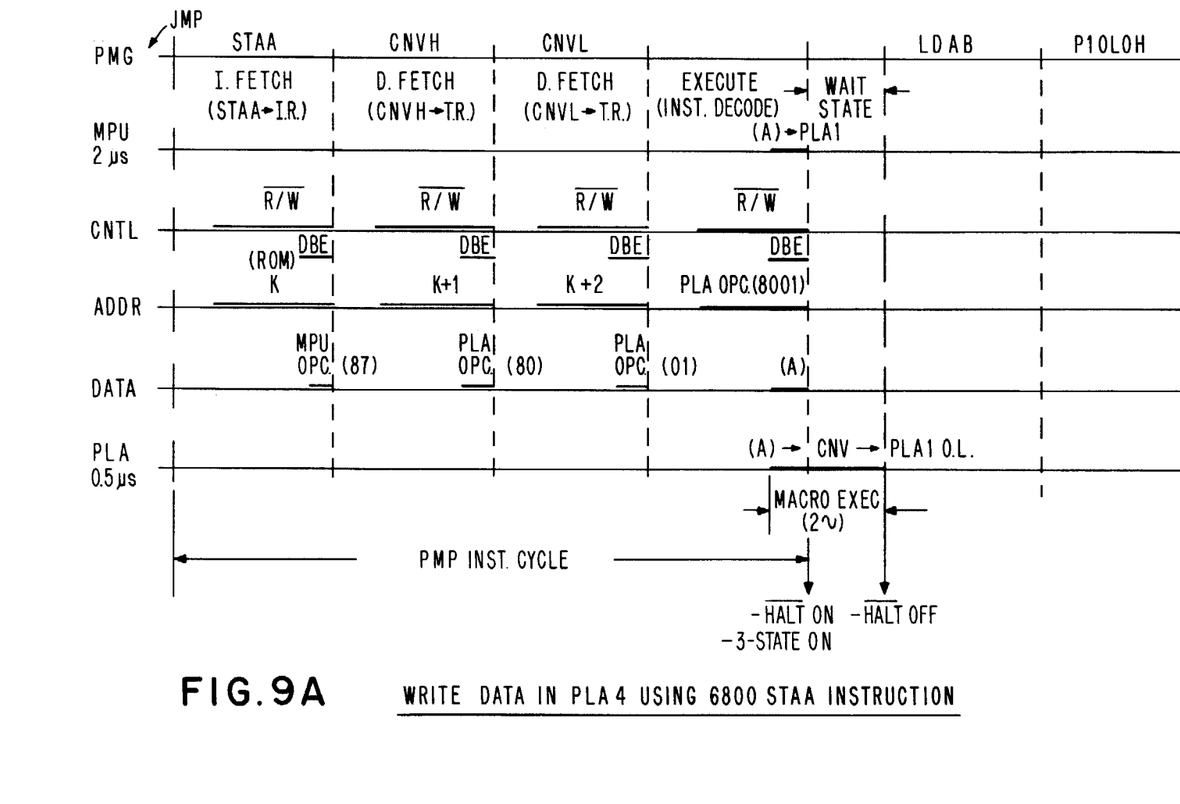
FIGS. 9A and 9B are timing diagrams relating to the embodiment of FIG. 3.

Assume that one byte of binary data stored in the 6800 (MPU 7) accumulator A is to be converted through a table in PLA 4 of FIG. 1 and the result is to be stored back in the MPU 7 accumulator B. The program flow of this operation is shown in FIG. 8. When the program counter (PC) 41 and 42 of FIG. 2 encounters the JMP instruction at location n of ROM 8, it will jump to the subroutine location k after the execution of the JMP instruction. At the same time, the location of the next main instruction, n+2, will be stored away on the stack. After this is completed, the MPU will start to execute the subroutine by fetching STAA, CNV (conversion instruction, coded as 10000001, see FIG. 3) and execute them. The timing is shown in FIG. 9A. During this "write" cycle, the contents of the accumulator A are sent to the PLA via the data bus 3 sinking through the CNV1 table of AND array 26 and the executed result is stored in the output latches 13 of FIG. 3. At the end of the first conversion cycle (CNV1 shown in FIG. 3), both the $\overline{\text{Halt}}$ signal 23 and the PLA4 tri-state drivers 11 are on. The $\overline{\text{Halt}}$ signal is turned off when the second conversion cycle (CNV2) is completed.

However, the PLA 4 tri-state drivers 11 remain in high impedance state.

Figure 9B:
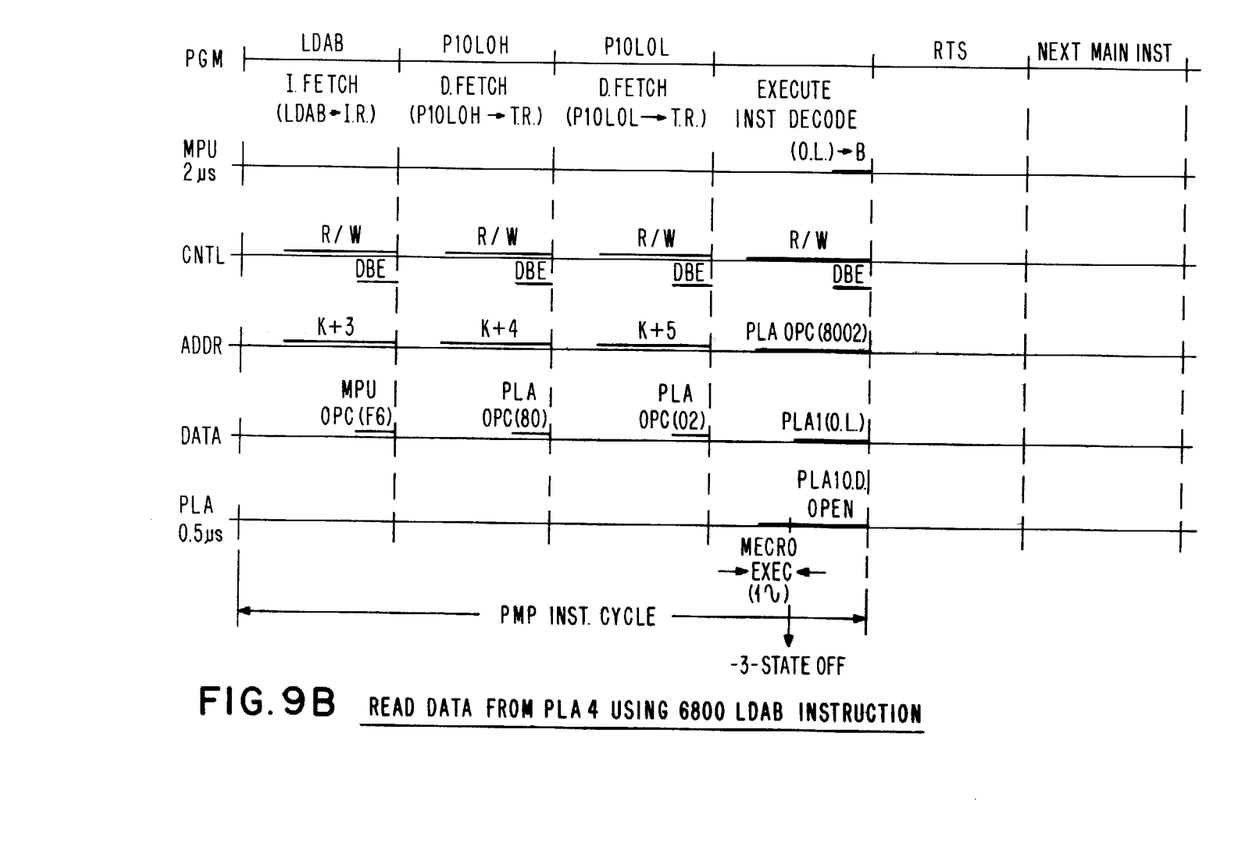

It should be pointed out that during the fetching cycles, the STAA opcode (one byte) is stored in the MPU 7's instruction register, and the CNV opcode (two bytes) in a temporary register within the MPU 7. During the execution cycle, the STAA opcode and the CNV opcode are decoded through the MPU 7's decoder circuitry and the PLA 4's AND array 26 respectively. When the $\overline{\text{Halt}}$ signal is activated, the MPU 7 is put in the wait state until the $\overline{\text{Halt}}$ signal is off. After that, the PC will be incremented and the MPU 7 will start to fetch the next instructions, LDAB and P1OLO (PLA 4 output latch open instruction, coded as 10000010 shown in FIG. 3) and execute them. When the P1OLO instruction is executed, the TSC signal on line 12 becomes low. This brings the outputs of the output latches 13 back to the normal state from the high-impedance state, and the contents of the output latches 13 become available at the data bus 3. The timing of this read cycle is shown in FIG. 9B. After this cycle is completed, the contents of the output latches 13 are loaded into the accumulator B, and RTS (return from subroutine) takes place. The PC then goes back to the location of the next main instruction, n+2. While the SP (stack pointer) points back to the previous location, m, as shown in FIG. 8.

EXAMPLE 2

Assume that the data from the peripheral devide 10 of FIG. 1 (a sensor, for example), are to be converted first using the CNV table in PLA5 of FIG. 5 and the result is to be sent to the PLA4 for comparison and adjustment using the CMP & AJS macro. The adjusted data is then to be stored in the MPU 7's accumulator A until the peripheral device 10 makes a request for them in order to activate a mechanical switch attached to the peripheral device.

Figure 10:
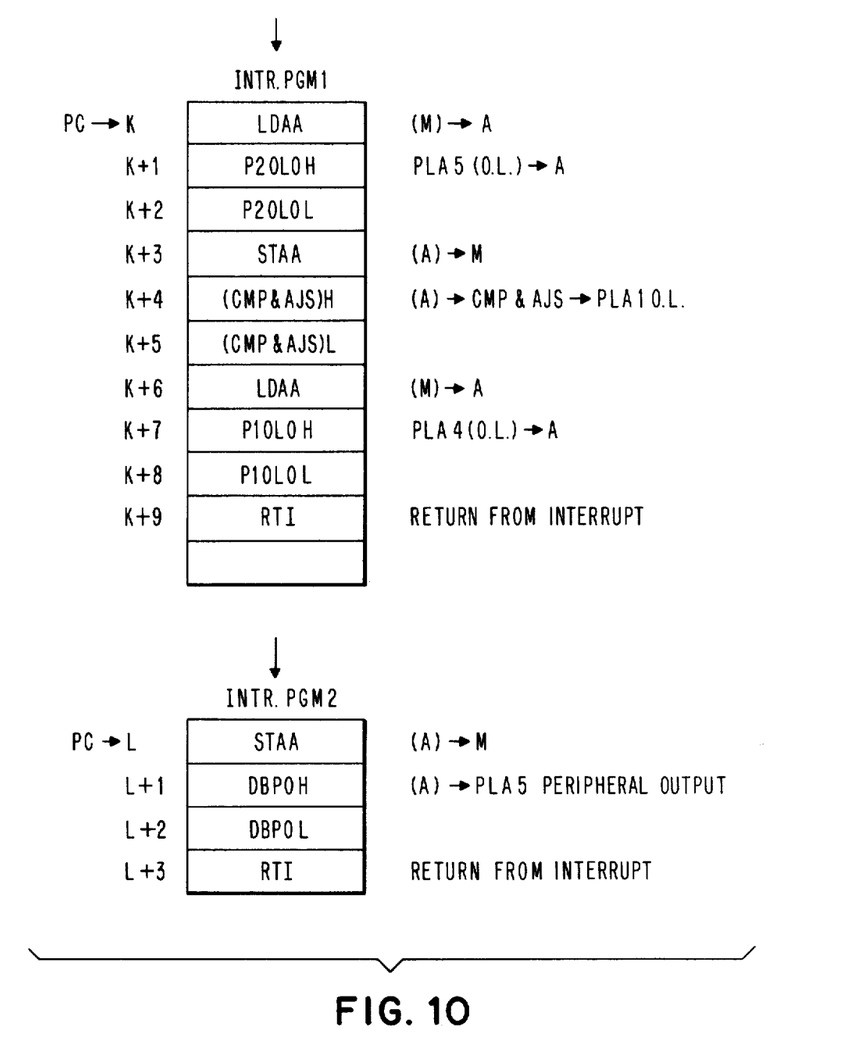
FIG. 10 is a program flow diagram relating to the embodiment of FIG. 5.

FIGS. 6 and 10 show the program flow of this specific operation. Referring to FIG. 5, when the data from the peripheral device 10 are ready, and the input ready signal on line 34 is up, the data will sink through the CNV table of AND array 51. The result will be stored in the output latches 59. At the same time, the $\overline{\text{IRQ}}$ signal on line 38 goes down. When the MPU 7 senses the IRQ signal, it goes through the hardware interrupt sequence shown in FIG. 6, and the PC jumps to the interrupt routine location, k, shown in FIG. 10. The MPU 7 starts to fetch the instructions, LDAA and P2OLO (PLA5 output latch open instruction coded as 10000100 shown in FIG. 5), and execute them. The function of the P2OLO instruction is the same as that of the P1OLO instruction as described previously. After the execution, the MPU 7 loads the contents of the PLA5 output latches 59 to the accumulator A.

Figure 11:
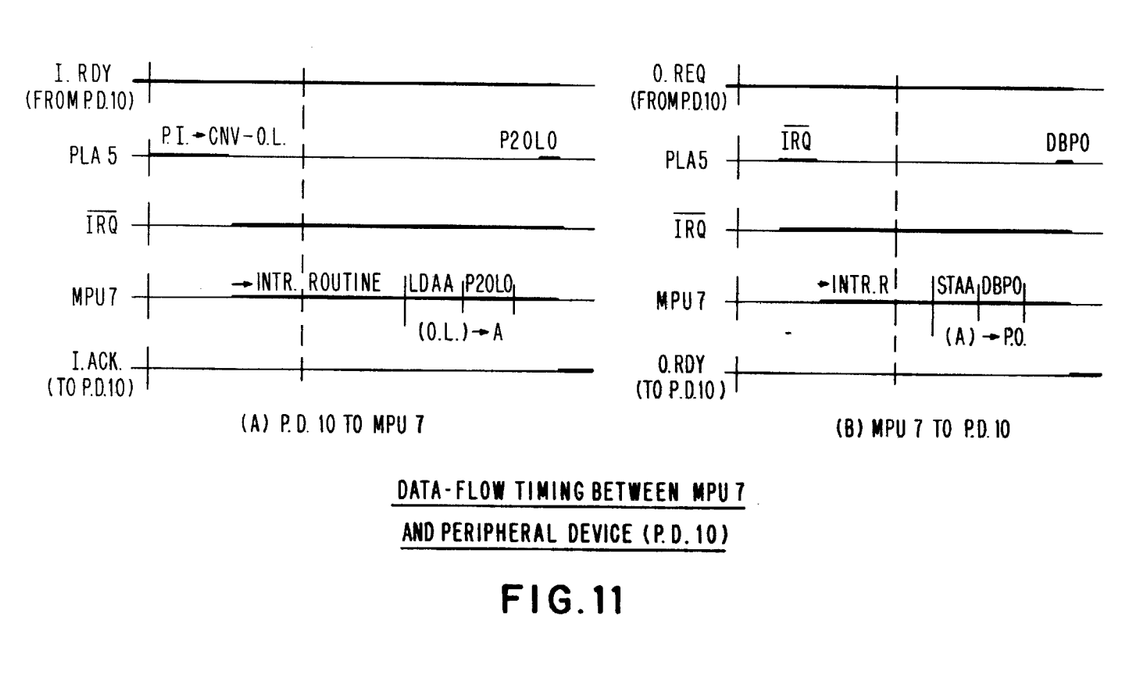
FIGS. 11A and 11B and 12 are timing diagrams relating to the embodiment of FIG. 5.

FIG. 11A shown the timing of the control lines, the PLA5 and the MPU7. As shown in FIG. 10, when the PC steps up to the location K+2, the MPU 7 fetches and executes the STAA and the CMP & AJS (compare and adjust) instructions. This causes the contents of the accumulator A to be transferred to PLA4, sinking through the CMP & AJS macro (OPCODE=10000011 shown in FIG. 3). The result is then stored in the PLA4 output latches 13. These data are transferred back to the accumulator A when the MPU 7 executes the next instructions, LDAA and P1OLO. Finally the execution of the return from interrupt instruction (RTI) ends the interrupt routine and restores the MPU 7 control to the main program.

Since the peripheral device 10 and the 6800 (MPU 7) operate asynchronously, the request of data by the peripheral device can occur either before or after the RTI instruction is executed. If it happens before the RTI instruction is executed, by raising the output request line 36 (from peripheral device 10) which in turn activates the $\overline{\text{IRQ2}}$ signal on line 71 of FIG. 5, the MPU 7 will not recognize the next interrupt until the first one has been completely serviced. When the $\overline{\text{IRQ2}}$ signal is recognized by the MPU 7, the external interrupt priority circuitry will direct the MPU 7 to the proper locations in memory (ROM 8) for obtaining the vector, as shown in FIG. 10. The MPU's next step is to fetch the instructions, STAA and DBPO (data bus to peripheral output instruction coded as 10000101 shown in FIG. 5), and to execute them. This brings the contents of the accumulator A to the peripheral output port via the data bus 3. At the same time, the output ready line 37 of FIG. 5 is activated.

Figure 12:
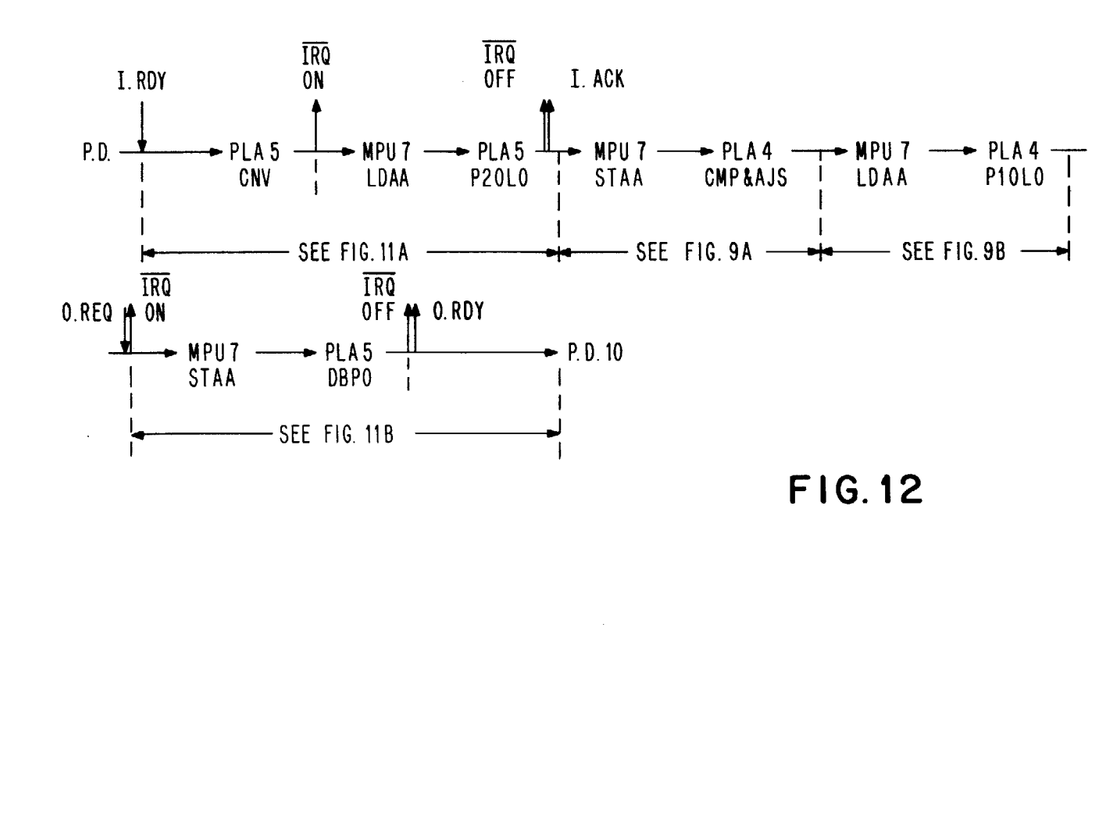

FIG. 11B shows the timing of the data flow from the MPU 7 to the peripheral device 10. It should be noted that, in normal hand-shake operation, the input ready (34) and the output request (36) signals of FIG. 5 (both from the peripheral device) come after the output ready (37) and the input acknowledge (35) lines, both from PLA 4, are at the high state respectively. FIG. 12 shows the entire data flow between the peripheral device and the MPU 7 via the PLA's 4 and 5. Also shown are the instructions used to control the flow.

EXAMPLE 3

Assume that a block of data is to be transferred from the main memory 9 of FIG. 1 to a CRT display (not shown) by defining the first location, M1, and the last location, M2, of the data block. (In a normal operation, an input device such as a keyboard is connected to the peripheral device 10 input, and the CRT is connected to the peripheral device 10 output of the PLA 5 shown in FIG. 1 while the DMA operation is performed by the PLA 6 of FIG. 7).

The program for this DMA transfer using the interrupt service routine is shown in the following table.

| LABEL | MNEMONIC | OPERHND | COMMENT | CYCLES |
| --- | --- | --- | --- | --- |
| TNTR. PGM 3 | LDAA | M1 ADDR | Load ACMLTR A with M1 | 3 |
| | LDAB | M2 ADDR | Load ACMLTR B with M2 | 3 |
| | STAA | STP3A | Store M1 from ACMLTR A to PLA6 ACMLTR A | 5 |
| | STAB | STP3B | Store M2 from ACMLTR B to PLA6 ACMLTR B | 5 |
| | STAA* | DPOS | Selects Data Bus to Peripheral Output Macro | 4 |
| | STAA* | INCMPS | Selects INC, CMP and ADDR OUT Macro | 4 |
| | STAA* | DMAR | Make a DMA Request | 4 |
| Exit | RIT | | Return from Interrupt | 10 |

*The contents of the accumulator A have no effect on the selection of the macros in PLA5 and PLA6 because the macro columns corresponding to the data input bus are all coded as "Do Not Care".

When the keyboard signals a data transfer, the processor will start to serve the interrupt routine. First, the M1 and M2 addresses are loaded to the Accumulators A and B of PLA6 shown in FIG. 7. Secondly, the data bus to peripheral output (DBPO) macro in the OR array 56 of PLA5 shown in FIG. 5 and the INC, CMP and ADDR out (INCMP) macros in the OR array 72 of PLA6 shown in FIG. 7 are selected. The DBPO macro provides a path for transferring memory data from the bus 3 to the peripheral output 33 (CRT) of FIG. 5. The INCMPS macro is a combination of a counter, a comparator, and a path for transferring data from the PLA6 accumulator A to the address bus output 62 of FIG. 7. When the macro is executed after the BA (DMA Grant) signal on line 63 goes high, the counter will start to count from M1 to M2 and stop. In the meantime, a series of memory addresses are generated; data are then fetched and moved from the main memory to the CRT display via the DBPO path in PLA5.

Since the Halt (DMA request) signal on line 23 of FIG. 7 will probably be asynchronous with respect to the instruction currently being executed, this will result in a variable time delay from Halt going low to BA (DMA Grant) on line 63 of FIG. 7 responding by going high. The maximum time delay would occur if the Halt line 23 goes low on the first cycle of a long instruction such as Software Interrupt (SWI), which is 12 cycles long. Added to the 12 cycles required to complete SWI is the one cycle required for the MPU7's address, data and R/W signals to go into the high impedance state. This delay must be taken into account in the operation of the DMA transfer.

Having thus described our invention, what we claim as new, and desire to secure by Letters Patent is:

1. Apparatus for extending the functional capability of a microprocessor having a given standard set of instructions stored therein to execute at least one additional instruction beyond its capability to execute said given standard set of instructions, said microprocessor communicating with system components through a standard bussing system comprising a control bus, an address bus and a data bus, said apparatus comprising at least one programmed logic array connected to said control, address and data busses, each said programmed logic array being equipped to interpret a respective address on said address bus as a respective additional instruction said microprocessor being connected to said control, address and data busses and providing said standard set of instructions on said control bus and addresses on said address bus, each said programmed logic array comprising instruction register means connected to said address bus for receiving and temporarily storing said respective address constituting said respective additional instruction, an AND array connected to receive each address stored in said register for generating a product term in response to said respective address, an OR array connected to receive said product term from said AND array for generating resulting signal, for executing said respective additional instruction.

2. Apparatus as in claim 1 wherein said resulting signal is applied to said data bus.

3. Apparatus as in claim 1 wherein said resulting signal is applied to said control bus.

4. Apparatus as in claim 1 and further including a peripheral device coupled to said at least one programmed logic array.

5. Apparatus as in claim 4 wherein said resulting signal is applied to said peripheral device.

6. Apparatus as in claim 4 wherein said resulting signal is applied to said data bus.

7. Apparatus as in claim 4 wherein said resulting signal is applied to said control bus.

* * * * *